United States Patent [19]

Lemstra et al.

[11] Patent Number: 4,579,784

[45] Date of Patent: Apr. 1, 1986

[54] LAMINATES ON THE BASIS OF POLYPROPYLENE AND PROCESS FOR PREPARING SUCH LAMINATES

[75] Inventors: Pieter J. Lemstra, Brunssum; Henricus E. H. Meyer, Obbicht; Rudolf J. H. Burlet, Geleen, all of Netherlands

[73] Assignee: Stamicarbon B.V., Licensing Subsidiary of DSM, Geleen, Netherlands

[21] Appl. No.: 656,463

[22] Filed: Oct. 1, 1984

[30] Foreign Application Priority Data

Oct. 1, 1983 [NL] Netherlands ............... 8303379

[51] Int. Cl.$^4$ .................................................. B32B 27/08
[52] U.S. Cl. .................................... 428/516; 428/35; 428/518; 264/291; 264/DIG. 73; 156/244.11
[58] Field of Search ............... 525/57; 428/516, 518, 428/35; 156/244.11; 264/176 R, 288.4, 291, DIG. 73

[56] References Cited

U.S. PATENT DOCUMENTS

| | | | |
|---|---|---|---|
| 3,847,728 | 11/1974 | Hirata et al. | 428/518 |
| 3,931,449 | 1/1976 | Hirata et al. | 525/57 |
| 3,975,463 | 8/1976 | Hirata et al. | 525/57 |
| 4,362,844 | 12/1982 | Lemstra et al. | 525/57 |

*Primary Examiner*—Edith Buffalow
*Attorney, Agent, or Firm*—Cushman, Darby & Cushman

[57] ABSTRACT

The invention accords to a laminate at least consisting of a first layer from a mixture of at least a propylene polymer and an ethylene-vinylalcohol copolymer and a second layer from at least one propylene polymer, the first layer at least consisting of a mixture of 60–99 parts by weight of a substantially crystalline propylene polymer and 1–40 parts by weight of an ethylene-vinylalcohol copolymer, the second layer at least consisting of a substantially crystalline propylene polymer, the said ethylene-vinylalcohol copolymer having a melting temperature at atmospheric pressure which is at most equal to and not more than 30K lower than the melting temperature at atmospheric pressure of the one of the substantially crystalline propylene polymers used having the highest melting temperature, and the laminate having been subjected to multi-axial stretching to a degree of at least twice in at least 2 directions at a temperature which at most equals the melting temperature of the one of the substantially crystalline propylene polymers used having the highest melting temperature and to a process for preparing such a laminate.

12 Claims, No Drawings

LAMINATES ON THE BASIS OF POLYPROPYLENE AND PROCESS FOR PREPARING SUCH LAMINATES

The invention relates to laminates at least consisting of a first layer from a mixture of at least a propylene polymer and an ethylene-vinylalcohol copolymer and a second layer from at least a propylene polymer and a process for preparing these laminates. Such laminates are known from the W. German patent specification No. 2341782. These laminates can be used, for instance, for the production of film or of holders for packing purposes.

A disadvantage of the known laminates is that their optical properties are poor and that they cannot or hardly be stretched below the melting temperature of the propylene present without loss of their low gas permeability. Consequently, to maintain a low gas permeability, great thickness is required when using these laminates, which then, moreover, combines with poor optical properties.

In order to produce films which have good mechanical as well as good optical properties, but which can also function as barrier films for packing substances which are sensitive to oxidation or which must retain a certain $CO_2$ gas pressure, etc., polypropylene film is stretched and subsequently coated with polyvinylidene chloride (PVDC). Coated films are made by coating a finished stretched polypropylene film with a PVDC latex. An acknowledged disadvantage of these coated barrier films is that they are usually expensive and cannot be recycled.

Another process is co-extrusion of polypropylene (PP) with a thermoplastic material having good barrier properties like PVDC but without the disadvantage of a poor thermal stability (as a result of which PVDC cannot be worked as a thermoplastic material). A synthetic material having suitable barrier properties is ethylene-vinylalcohol copolymer (EVAL), a substance produced through solvolysis of an ethylene-vinylacetate copolymer. Through coextrusion it is possible to produce, for instance, PP-EVAL-PP compositions, in which an adhesion promotor (A) is applied between the PP and the EVAL for the necessary adhesion.

These co-extrudate films of the (PP-A-EVAL-A-PP) type have the advantage that the moisture-sensitive EVAL layer is enclosed between hydrophobic PP films and the composition as a whole has good barrier properties. A disadvantage is, however, that this kind of coextrudate films no longer qualifies for after-stretching and can consequently be made only in the form of cast film. For the biaxial stretching the chosen temperature must be below the melting point of the polypropylene, and at this temperature the customary EVAL is still a solid and as such its stretchability is far less good, than that of the polypropylene, which is in its semi-solid phase during stretching. Now the melting point of the EVAL is linked directly with the built-in ethylene of the copolymer and in principle it is possible to produce EVAL copolymers having a melting point lower than that of a PP-homopolymer or copolymer. However, the mechanical properties and particularly the visco-elastic properties of an EVAL are quite different from those of a PP-homopolymer or copolymer. Consequently, problems will remain if a coextrudate based on PP-A-EVAL-A-PP is to be subjected to biaxial after-stretching, on the one side because at the stretching temperature required, viz. the temperature at which the PP allows itself to be stretched to an optimum degree, the intermediate EVAL layer is either a synthetic solid with stretching properties entirely different from those of PP or a melt and consequently not compatible either with the stretch-strain characteristics of the PP-homo and/or copolymer outer layers. This does not rule out that a composition like the one mentioned above cannot, by means of well selected additives, be subjected to some degree of biaxial stretching, for instance through a vacuum forming process, but if higher standards are imposed in the multi-axial after-stretching, as in the bi-axial stretching to film with higher degrees of stretching, for instance at least twice in both stretching directions, and in the injection blow moulding of bottle parisons, insuperable technical problems will be encountered without the technical solutions being available.

For PP/EVAL compositions to lend themselves well to after-stretching is so important because EVAL is a relatively expensive plastic (also due to the expensive process of preparation), for which reason it is preferred that the EVAL barrier in the end product be present to a minimum thickness, the more so because EVAL as such is a very good barrier plastic and thicker layers are often not necessary. In coextrudates via cast film procedures the chosen thickness of the EVAL layer cannot be infinitely low, and the fact that it cannot be after-stretched consequently gives a relatively expensive film with, moreover, inferior mechanical properties compared with biaxially stretched PP film (BOPP) so also PVDC-coated BOPP.

According to the U.S. Pat. No. 3,847,728 plastic products having low gas permeability are made from mixtures of polyolefins and ethylene-vinylalcohol copolymers by melt extrusion followed by moulding above the melting temperatures of the two components. It is true that thus the desired barrier properties are obtained, but the good mechanical and particularly the good optical properties are lost. For polyolefins and ethylene-vinylalcohol copolymers cannot be mixed in the melt and in the solidified phase there are two phases, viz. a usually dispersed EVAL phase in a polyolefins matrix. As the stretching process takes place in the melt, the mechanical properties are inferior to those of products subjected to multi-axial after-stretching at a temperature below the melting point of the polyolefin, e.g. polypropylene.

In the U.S. Pat. No. 4,362,844 a description is given of stretching polypropylene/EVAL mixtures below the polypropylene melting temperature, in which process the melting temperature of the EVAL component in the immiscible system is lower than that of the PP matrix. The disadvantage of this system is that, as in the castfilm coextrusion process operation, it is not possible to use an unlimited minimum thickness, while the optical properties are often not satisfactory.

The invention fullfills the need of laminates having a low gas permeability combined with a small required thickness of the barrier layer and having good optical and mechanical properties.

According to the invention a laminate at least consisting of a first layer from a mixture of at least a propylene polymer and an ethylene-vinylalcohol copolymer and a second layer from at least a propylene polymer is characterized in that the first layer at least consists of a mixture of 60–99 parts by weight of a substantially crystalline propylene polymer and 1–40 parts by weight of an ethylene-vinylalcohol copolymer, that the second layer at least consists of a substantially crystalline propylene polymer, that the said ethylene-vinylalcohol copolymer has a melting temperature at atmospheric pressure which is at most equal to and not more than 30 K. lower than the melting temperature at atmospheric pressure of the one of the substantially crystalline propylene polymers used having the highest melting temperature, and that the laminate has been subjected to multi-axial stretching to a degree of at least twice in at least 2 directions at a temperature which is at most equal to the melting temperature of the one of the substantially crystalline propylene polymers used having the highest melting temperature and advantageously at most 35 K. lower than this melting temperature.

The invention also comprises a process for preparing laminates at least consisting of a first layer from a mixture of at least one propylene polymer and an ethylene-vinylalcohol copolymer and a second layer from at least one propylene polymer, characterized in that, advantageously by coextrusion, a first laminate is prepared at least consisting of a first layer at least consisting of a mixture of 60–99 parts by weight of a substantially crystalline propylene polymer and 1–40 parts by weight of an ethylene-vinylalcohol copolymer and a second layer at least consisting of a substantially crystalline propylene polymer, the said ethylene-vinylalcohol copolymer having a melting temperature at atmospheric pressure at most equalling and not more than 30 K. lower than the melting temperature at atmospheric pressure of the one of the substantially crystalline propylene polymers used having the highest melting temperature and that this first laminate is subsequently subjected to multi-axial stretching to a degree of at least twice in at least 2 directions at a temperature which at most equals the melting temperature of the one of the substantially crystalline propylene polymers used having the highest melting temperature and which is advantageously at most 35 K. lower than this melting temperature, and thus a second laminate is formed.

The term 'substantially crystalline propylene polymer' is understood here to mean a substantially crystalline polymer predominantly consisting of propylene units. It may contain minor quantities, for instance 30% by weight at most, of other monomer units, particularly ethylene and/or one or more alkenes-1 with 4–6 carbon atoms per molecule, e.g. butene-1, 4-methylpentene-1 or hexene-1. The propylene polymer may advantageously be a propylene homopolymer or a block copolymer of propylene with 1–30% by weight, advantageously 1–15% by weight, of ethylene, or a copolymer of propylene and ethylene with random distribution of the various monomer units having an ethylene content of advantageously 0.1–5% by weight.

The ethylene-vinylalcohol copolymer substantially consists of ethylene and vinylalcohol units and may also contain minor quantities of other monomer units, particularly vinyl ester units. Such copolymers can be prepared by complete or partial saponification of ethylene-vinylester copolymers. The vinylester is more specifically a vinylester of a carboxylic acid with 1–6 carbon atoms per molecule; it is advantageously vinylacetate. The degree of saponification is advantageously at least 90 moles %, specifically 95 to 99 moles %. The ethylene-vinylalcohol copolymer has a melting temperature at atmospheric pressure which is not higher than the melting temperature of the one of the substantially crystalline propylene polymers used having the highest melting temperature and which is not more than 30 K., advantageously not more than 20 K., lower than this melting temperature. The melting temperature of the ethylene-vinylalcohol copolymer depends on the degree of saponification and particularly on the ethylene content. The melting temperature of the ethylene-vinylalcohol copolymer can be adjusted in a simple manner to that of the propylene polymer used by the adjustment of the ethylene content of the copolymer. The relation between ethylene content and melting temperature of the ethylene-vinylalcohol copolymer is known to the person skilled in the art. The ethylene content is advantageously 30–55 moles %, more advantageously 35–50 moles %.

Advantageously the mixture to be used according to the invention in the said first layer contains 10–30% by weight ethylene-vinyl-alcohol copolymer, more advantageously 20–30% by weight.

This mixture may also contain minor quantities, for instance up to 10% by weight, of other components, such as stabilizers, lubricants, antistatic agents, other polymer components, etc., and particularly one or more adhesion promotors for improving the capacity of the propylene polymer and the ethylene-vinylalcohol copolymer to combine. Examples of suitable adhesion promoters are polypropylene modified with acid groups, for instance polypropylene modified by graft polymerization with maleic anhydride, acrylic acid or another monomer yielding acid groups, alkene-unsaturated acid copolymer, for instance ethyleneacrylic acid copolymer, or ionomers. Such an adhesion promotor constitutes for instance 1–10% by weight of the plastics mixture.

In addition to the said first and second layers, a laminate according to the invention may contain even further layers. The composition of these layers must be such that they have a good bond with the said first and/or second layers and advantageously show a melting range at atmospheric pressure that does not end beyond the melting temperature of the one of the substantially crystalline propylene polymers used having the highest melting temperature. Examples are low density polyethylene layers and linear low density polyethylene layers. The laminate according to the invention can, moreover, be provided with one or more coating layers.

In the production of a laminate according to the invention a mixture of a crystalline propylene polymer and an ethylene-vinylalcohol copolymer as described above in respect of the specifications (particularly melting temperature) is started from while adding to the mixture the additives desired, or considered to be necessary. This mixture may be a simply tumbled mixture, the respective components of which are mixed at room temperature as granulate and/or powder, or it may be a granulated kneaded mixture, the components of which have been mixed in the melt, for instance via a continuous kneader or another device in which various plastics are mixed with each other in the melted phase. This mixture constitutes the basis for the said first layer.

In the production of the laminate two cases are distinguished:

1. Production of film/sheet followed by stretching/vacuum forming and/or pressing;

2. Production of containers via multi-axial stretching on the basis of parisons.

In the first group (1) the mixture described above is started from for the first layer, which is supplied to an extruder forming part of a coextrusion line. The mixture is extruded, the second layer and, if so desired, other layers, too, being supplied via satellite extruders. The composition as a whole is subjected to multi-axial, preferably biaxial, stretching below the melting temperature of the one of the substantially crystalline propylene polymers used having the highest melting temperature. This is done in a manner known per se, for instance by means of a stretching frame or by simultaneous and/or sequential stretching on a stretching device normally used for the production of BOPP film. The coextruded film and/or sheet can be used also as a basis for the production of objects through vacuum forming, for instance deep drawing for holders for the packing industry.

In the above cases the coextruded sheet and/or film is consequently subjected to multi-axial stretching, this process being characterized in that the stretching is effected at a temperature below or at most equal to the melting temperature of the one of the substantially crystalline propylene polymers used having the highest melting temperature.

The process operation for biaxial stretching, as well as vacuum forming, etc., is known per se, see for instance I. M. Ward, Structure and Properties of Oriented Polymers, Material Science Series, Applied Science Publishers Ltd., London, (1975), Chapter 12.4.

In the second group (2) the mixture for the first layer as described above is started from again, but this time injection-moulded parisons are made via multi-layer injection moulding. In this process, for instance, the mixture (A) and a propylene polymer for the second layer (B) are injected into the mould one after another as a result of which a 3-layer wall A-B-A is formed as known, see for instance the W. German patent specification No. 2346135.

Other layer distributions are possible, too, via specific injection sequences and through specific injection-moulding nozzle designs, see for instance the W. German Offenlegungsschrift No. 2733913.

The result in all cases is a parison in which the first layer is enclosed between two second layers as described above. Except by multi-layer injection moulding, parisons can be made also by coextrusion to tubular semi-manufacturers, in which process a welding seam is applied in the melting phase. These parisons can be distinguished from the multi-layer injected products by the presence of a welding seam.

The parisons prepared in the above manner are brought to a temperature which at most equals the melting temperature of the one of the substantially crystalline propylene polymers used having the highest melting temperature and are subsequently subjected to multi-axial stretching to form the desired containers. During this stretching process the morphology of the blend again shows the desired change to a laminated structure with favourable barrier properties.

For techniques for the production of laminates according to the invention reference is made for the sake of brevity to the books 'Extrudierte Feinfolien und Verbundfolien' (1976). 'Spritzblasen' (1976), 'Technologien des Blasformens' (1977) and 'Folien, Gewebe, Vliesstoffe aus Polypropylen' (1979) published by the Verein Deutscher Ingenieure (VDI-Verlag GmbH, Düsseldorf) in the Ingenieurswissen series. The stretch ratio is at least 2 in at least two directions, e.g. 2–10. The extrusion temperature may be equal to the usual extrusion temperatures of polypropylene and may be, e.g., 450 to 550 K. The stretching temperature at most equals the melting temperature of the one of the substantially crystalline propylene polymers used having the highest melting temperature. 'Melting temperature' is understood here to mean the temperature at which the propylene polymer melts, measured with Differential Scanning Calorimetry with a heating rate equalling that applied in the stretching process. Advantageously the stretching temperature is between the melting temperature of the one of the substantially crystalline propylene polymers used, having the highest melting temperature and 35 K. below, particularly between 400 and 435 K.

The products according to the invention have a particularly low permeability to gases such as oxygen, water vapour and carbon dioxide. They have good mechanical properties, particularly good rigidity and a good impact resistance, and their transparency is good.

The invention is further elucidated by means of the following non-restrictive example and the comparative experiments.

EXAMPLE I

A mixture consisting of 30 parts by weight ethylenevinylalcohol copolymer (EVAL) with a melt index of 5 dg/min (ASTM-D 1238, 463 K., 2.16 kg) and an ethylene content of 40 moles %, 5 parts by weight Modic-P300M (a trademark of Mitsui for modified polypropylene) and 65 parts by weight propylene homopolymer with a melt index of 1.3 dg/min (ASTM-D 1238, 503 K., 2.16 kg) is kneaded with a ZSK/Werner and Pfleiderer kneader. The granulate obtained is coextruded with a propylene homopolymer of the same type as used in the mixture described above.

The coextruded sheet with a second layer/first layer/second layer thickness ratio of 10/5/10 is stretched biaxially at 433 K.

The following table shows the degree of stretching a×b, where a indicates the stretching ratio in longitudinal direction the film is subjected to and b the stretching ratio in transversal direction, the gas permeabilities $P(CO_2)$ of carbon dioxide at 296 K. and at 323 K. expressed in $mm^3$ of gas let through per $cm^2$ film surface per 24 hours and per bar pressure difference, the thickness of the laminate in $\mu m$, the gloss measured according to ASTM-D 2457 (45°) in %, the opacity according to ASTM-D 1003 in % and the breaking strength as breaking energy per unit of film thickness, measured in kJ/m on the basis of test method ASTM-D 1709-67A with a falling weight of 2.0 kg.

Comparative experiment A

A propylene homopolymer with a melt index of 1.2 dg/min (ASTM-D 1238, 503 K., 2.16 kg) is extruded to form a sheet having a thickness of 1 mm. After cooling, this sheet is heated up again to 435 K. and subjected to biaxial stretching. The stretching ratio is 5×8.

The table below gives the measured data of the resulting film.

Comparative experiment B

The stretched film formed according to Comparative Experiment A is coated with polyvinylidene chloride (PVDC) by spreading an aqueous 30% PVDC emulsion on the film and drying the whole. By applying a coating in this manner on one side several times a total PVDC layer of about 5 $\mu m$ is applied on the polypropylene film. The table below shows the properties of the coated film formed in this manner.

The results of the example and of the comparative experiments are given in the table below.

| Number | degree of stretching a × b | P($CO_2$) at 296 K | P($CO_2$) at 323 K | thickness | gloss | opacity | breaking strength |
|---|---|---|---|---|---|---|---|
| I | 4 × 4 | 15 | 70 | 30 | 75 | 3 | 140 |
| A | 5 × 8 | 800 | 5000 | 25 | 85 | 1 | 150 |
| B | 5 × 8 | 2 | 70 | 30 | 82 | 5 | 120 |

From the above it will be evident that the mechanical and optical properties of a laminate according to the invention are virtually equally good as those of a stretched propylene homopolymer, in combination with an impermeability to gas virtually equally good as that of a PVDC-coated polypropylene film, which polypropylene film is far more expensive than the laminate according to the invention, whereas the laminate according to the invention can be recycled very easily in the production of new laminate according to the invention and PVDC-coated polypropylene film cannot be recycled in practice.

We claim:

1. A laminate comprising a first layer comprising a mixture of from 60 to 99 parts by weight of at least one substantially crystalline propylene polymer and from 1 to 40 parts by weight of an ethylene-vinylalcohol copolymer and a second layer comprising at least one substantially crystalline propylene polymer,
   wherein said ethylene-vinylalcohol copolymer has a melting point at atmospheric pressure which is no higher than the melting temperature at atmospheric pressure of the highest melting substantially crystalline propylene polymer, and not less than 30° K. below said melting temperature,
   and wherein the laminate has been multi-axially stretched at a stretch ratio of at least two and in at least two directions at a temperature which at most equals said melting temperature.

2. Laminate according to claim 1, wherein the ethylene content of the ethylene-vinylalcohol copolymer is 30–55 moles %.

3. Laminate according to claim 2, wherein the ethylene content of the ethylene-vinylalcohol copolymer is 35–50 moles %.

4. Laminate according to claim 1, wherein the degree of saponification of the ethylene-vinylalcohol copolymer is at least 90 moles %.

5. Laminate according to claim 1, wherein the first layer contains 10–30% by weight of ethylenevinylalcohol copolymer.

6. Laminate according to claim 1, wherein said the first layer contains 1–10% by weight of an adhesion promotor.

7. A laminate according to claim 1 having three layers wherein the inner layer is said first layer and the outer layers each has a composition according to said second layer.

8. Laminate according to claim 1, wherein the number of layers is 3.

9. A laminate consisting of a first layer comprising a mixture of from 60 to 99 parts by weight of at least one substantially crystalline propylene polymer and from 1 to 40 parts by weight of an ethylene-vinylalcohol copolymer and a second layer comprising at least one substantially crystalline propylene polymer,
   wherein said ethylene-vinylalcohol copolymer has a melting point at atmospheric pressure which is no higher than the melting temperature at atmospheric pressure of the highest melting substantially crystalline propylene polymer, and not less than 30° K. below said melting temperature,
   and wherein the laminate has been multi-axially stretched at a stretch ratio of at least two and in at least two directions at a temperature which at most equals said melting temperature.

10. A process for preparing a laminate comprising a first layer comprising a mixture of at least one propylene polymer and an ethylene-vinylalcohol copolymer and a second layer comprising at least one propylene polymer comprising the steps of:
    forming a first layer comprising a mixture of 60–99 parts by weight of a substantially crystalline propylene polymer and 1–40 parts by weight of an ethylene-vinylalcohol copolymer,
    forming a second layer comprising a substantially crystalline propylene polymer,
    said ethylene-vinylalcohol copolymer having a melting point at atmospheric pressure which is no higher than the melting temperature at atmospheric pressure of the highest melting substantially crystalline propylene polymer, and not less than 30° K. below said melting temperature,
    bringing said layers into contact with each other to form said laminate, and
    multi-axially stretching the thus-formed laminate at a stretch ration of at least two in at least two directions at a temperature which is at most equal to said melting temperature.

11. A process according to claim 10, wherein the stretching step includes the step of multi-axially stretching the laminate at a temperature no higher than the melting temperature of the highest melting substantially crystalline propylene polymer, and no lower than a temperature 35° K. below said melting temperature.

12. A process according to claim 10, wherein the layers are co-extruded to form the laminate.

* * * * *